(12) United States Patent
Wang et al.

(10) Patent No.: US 12,511,329 B1
(45) Date of Patent: Dec. 30, 2025

(54) METHOD, DEVICE, AND COMPUTER PROGRAM PRODUCT FOR GENERATING VIDEO DATABASE

(71) Applicant: Dell Products L.P., Round Rock, TX (US)

(72) Inventors: Zijia Wang, London (GB); Min Gong, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/781,552

(22) Filed: Jul. 23, 2024

(30) Foreign Application Priority Data

Jun. 28, 2024 (CN) .......................... 202410865029.X

(51) Int. Cl.
| | | |
|---|---|---|
| *G06F 16/00* | (2019.01) | |
| *G06F 16/71* | (2019.01) | |
| *G06F 16/738* | (2019.01) | |
| *G06F 16/783* | (2019.01) | |

(52) U.S. Cl.
CPC ............ *G06F 16/71* (2019.01); *G06F 16/739* (2019.01); *G06F 16/783* (2019.01)

(58) Field of Classification Search
CPC ....... G06F 16/71; G06F 16/739; G06F 16/783
See application file for complete search history.

(56) References Cited

U.S. PATENT DOCUMENTS

| | | | | |
|---|---|---|---|---|
| 11,595,614 | B1* | 2/2023 | Mahyar | ................ G11B 27/031 |
| 2017/0127016 | A1* | 5/2017 | Yu | .......................... G06N 3/084 |
| 2018/0295428 | A1* | 10/2018 | Bi | ....................... H04N 21/8153 |
| 2020/0293783 | A1* | 9/2020 | Ramaswamy | ........... G06N 3/09 |
| 2020/0401621 | A1* | 12/2020 | Bender | ................. G06F 16/735 |

(Continued)

OTHER PUBLICATIONS

H. Luo et al., "CLIP4Clip: An Empirical Study of CLIP for End to End Video Clip Retrieval," arXiv:2104.08860v2, May 8, 2021, 14 pages.

(Continued)

*Primary Examiner* — Syed H Hasan
(74) *Attorney, Agent, or Firm* — Ryan, Mason & Lewis, LLP

(57) ABSTRACT

Illustrative embodiments of the disclosure include a method, device, and computer program product for generating a video database. The method includes determining a contextual feature indicating contextual information of a video. The method further includes determining, for a video frame in the video, an audio feature indicating voice text and an ambient sound associated with the video frame. The method further includes determining, for the video frame, a visual feature of the video frame. The method further includes generating a video database based on the contextual feature, the audio feature, and the visual feature. In this way, video features stored in the video database more accurately reflect the real meaning and contextual information of the video, and the generated video database can provide matching results that are more accurate and better conform with user demands for both a video retrieval system and a recommendation system, thus improving the user experience.

20 Claims, 8 Drawing Sheets

(56) References Cited

U.S. PATENT DOCUMENTS

2022/0179871 A1* 6/2022 Ahmed ................ G06N 20/00
2023/0419663 A1* 12/2023 Nir ........................ G06V 20/41

OTHER PUBLICATIONS

H. Fang et al., "CLIP2Video: Mastering Video-Text Retrieval via Image CLIP," arXiv:2106.11097v1, Jun. 21, 2021, 10 pages.
C. Sun et al., "VideoBERT: A Joint Model for Video and Language Representation Learning," 2019 IEEE/CVF International Conference on Computer Vision (ICCV), Oct. 2019, pp. 7464-7473.
L. Li et al., "HERO: Hierarchical Encoder for Video+Language Omni-representation Pre-training," arXiv:2005.00200v2, Sep. 29, 2020, 21 pages.

\* cited by examiner

METHOD, DEVICE, AND COMPUTER PROGRAM PRODUCT FOR GENERATING VIDEO DATABASE

RELATED APPLICATION

The present application claims priority to Chinese Patent Application No. 202410865029.X, filed Jun. 28, 2024, and entitled "Method, Device, and Computer Program Product for Generating Video Database," which is incorporated by reference herein in its entirety.

FIELD

The present disclosure relates to the field of data management, and more particularly, to a method, device, and computer program product for generating a video database.

BACKGROUND

In the field of video management and retrieval, a video database is a common tool for storing and managing massive video data. With the explosive growth of video data, it has become the focus of technical research as to how to store and manage such video data efficiently and in an orderly manner. A video database is typically generated based on video content, which typically includes image information, such as color, shape, texture, and object, as well as text information, such as subtitle, label, and the like.

The process of construction of a video database typically includes analysis of the image information and text information in the video content. The feature determination for the image information and semantic understanding of the text information can be realized through techniques such as image processing and natural language processing. Meanwhile, the correspondence between the two types of modal information is analyzed, and the features that can represent and describe the video content are determined to generate a video database.

SUMMARY

Embodiments of the present disclosure provide a method, device, and computer program product for generating a video database.

In a first aspect of embodiments of the present disclosure, a method for generating a video database is provided. The method includes determining a contextual feature indicating contextual information of a video. The method further includes determining, for a video frame in the video, an audio feature indicating voice text and an ambient sound associated with the video frame. The method further includes determining, for the video frame, a visual feature of the video frame. The method further includes generating a video database based on the contextual feature, the audio feature, and the visual feature.

In a second aspect of embodiments of the present disclosure, an electronic device is provided. The electronic device includes at least one processor, and a memory coupled to the at least one processor and having instructions stored therein. The instructions, when executed by the at least one processor, cause the electronic device to perform actions comprising: determining a contextual feature indicating contextual information of a video; for a video frame in the video, determining an audio feature indicating voice text and an ambient sound associated with the video frame; for the video frame, determining a visual feature of the video frame; and generating a video database based on the contextual feature, the audio feature, and the visual feature.

In a third aspect of embodiments of the present disclosure, a computer program product is provided. The computer program product is tangibly stored on a non-transitory computer-readable medium and comprises machine-executable instructions. The machine-executable instructions, when executed by a machine, cause the machine to perform actions comprising: determining a contextual feature indicating contextual information of a video; for a video frame in the video, determining an audio feature indicating voice text and an ambient sound associated with the video frame; for the video frame, determining a visual feature of the video frame; and generating a video database based on the contextual feature, the audio feature, and the visual feature.

It should be understood that the content described in this Summary is neither intended to define key or essential features of embodiments of the present disclosure, nor intended to limit the scope of the present disclosure. Other features of the present disclosure will become readily understood from the additional description provided herein.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, identical or similar reference numerals represent identical or similar elements, in which.

DETAILED DESCRIPTION

Figure 1:
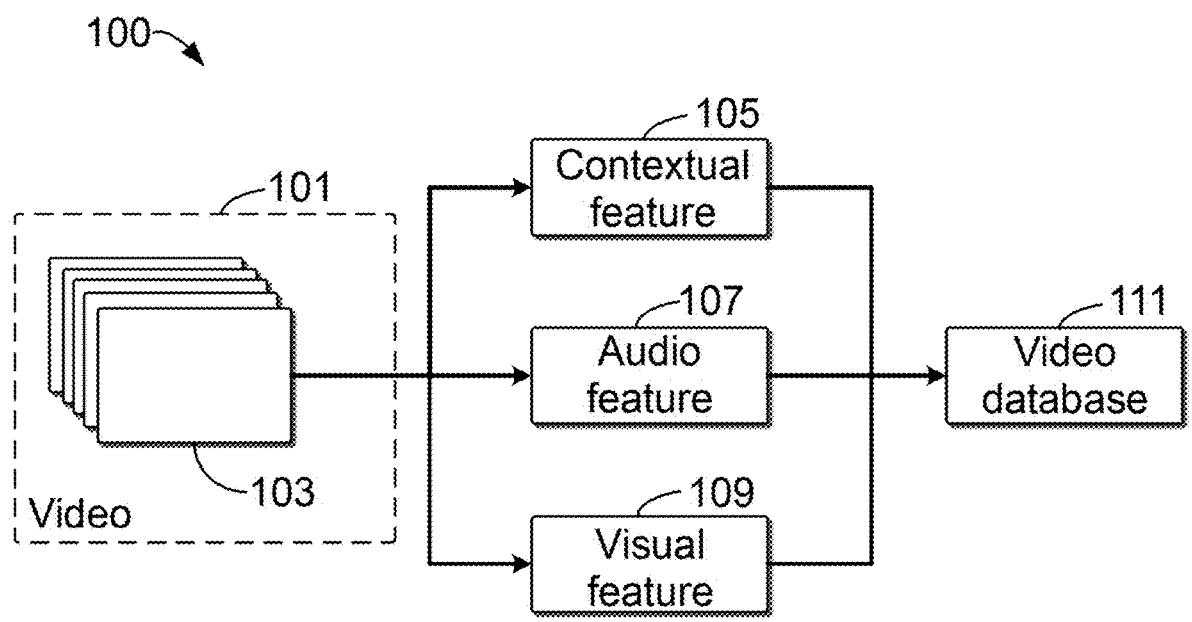
FIG. 1 is a schematic diagram of an example environment in which embodiments of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included herein.

In the related art, the method of video database generation based on visual content is typically used. The content-based generation method analyzes the visual content of a video, such as color, shape, texture, or features determined by a deep neural network. However, this method has obvious defects, that is, it is highly dependent on direct analysis of the video content and ignores information outside the video content. Therefore, when a video database is generated only based on the video content, there may be misunderstanding of the video content, especially in the case where the database is generated by relying only on content such as images or subtitles, which are more likely to cause the inaccurate correspondence between features and videos in the database.

A video database typically serves to store and manage video data, and supports retrieval and recommendation functions. However, for the video database generated by the above method, due to the inaccuracy of video features, it is difficult for a retrieval system to find the video that exactly matches the user demand, and it is also difficult for a recommendation system to provide video recommendations that meet the user interest. Meanwhile, the content analysis system may produce misleading conclusions, such as wrong classification or labeling. Such inaccuracies and misleading conclusions directly affect the user experience, so that users have to spend more time and energy to find interesting content.

In view of this, an embodiment of the present disclosure provides a solution for generating a video database. In this solution, for a video frame, a contextual feature indicating contextual information of the video, an audio feature indicating voice text and an ambient sound associated with the video frame, and a visual feature are determined, and the video database is generated through the contextual feature, the audio feature, and the visual feature. In this way, the video features stored in the video database more accurately reflect the real meaning and contextual information of the video, and the generated video database can provide matching results that are more accurate and better conform with user demands for both the video retrieval system and recommendation system, thus improving the user experience.

FIG. 1 is a schematic diagram of an example environment 100 in which embodiments of the present disclosure can be implemented. As shown in FIG. 1, the example environment 100 may include a video 101, which may include a plurality of video frames 103. The video 101 is a consecutive and dynamic image sequence, which typically includes a series of still images, that is, the video frames 103. The video frames 103 are played quickly at a certain rate, thus producing the visual effect of consecutive motion. The video 101 may originate from various sources, such as camera recording, digital media files, or network streaming media. The video frame 103 is a single still image in the video 101. The plurality of video frames 103 may include a video frame 103-1, a video frame 103-2, a video frame 103-3, a video frame 103-N, and so on, and each video frame contains certain image information, such as color, brightness, texture, and details. When the plurality of video frames 103 are consecutively played at a certain rate, a dynamic video effect is created.

In some embodiments, a contextual feature 105 can be determined based on the video 101, and the contextual feature 105 is used to indicate the contextual information of the video. The contextual information may be various types of data related to the video 101, which provide a context for the video frames 103 and assist in better understanding the content and background of the video 101. The contextual information may be information carried by the video 101 itself, such as the author, title, description, creation date, modification date, geographical location, or knowledge in a specific field. In addition to the data of the video 101 itself, the contextual information may also include external data related to the video. For example, if the video is downloaded from a social media platform, the contextual information may include the publisher information, release time, number of likes, number of comments, and the like. If the video is related to some event or place, the contextual information may also include news reports and map data related to the event or place. The contextual information can be used to enhance the understanding and analysis of the video frames 103, and the contextual feature 105 can be determined based on the contextual information to provide a rich background context for the video frames or the whole video sequence.

In some embodiments, an audio feature 107 can be determined for each video frame in the video 101, and the audio feature 107 is used to indicate voice text and an ambient sound associated with the video frame 103. When determining the audio feature 107 for the video frame 103, a plurality of adjacent frames to the video frame 103 can be determined first, and the adjacent frames and the targeted video frame 103 may be consecutive frames that can form a video clip. After determining the plurality of adjacent frames, the audio of the video clip corresponding to the plurality of adjacent frames and the video frame 103 can be determined. The audio may include a voice and an ambient sound. The voice may be a human voice, and the ambient sound may include a non-human voice, such as natural sound, traffic sound, animal sound, or mechanical sound. In the process of generating the audio feature 107, the human voice can be converted into voice text, which can be combined with the ambient sound to generate the audio feature 107 including multi-modal audio information in the video frame 103. The voice and the ambient sound can provide auxiliary information for understanding of the video content, and the audio feature 107 generated from the voice and the ambient sound can assist in understanding the video content.

In some embodiments, a visual feature 109 can be determined for each video frame in the video 101. The visual feature 109 is used to indicate image information included in the video frame 103, such as person, object, title, subtitle, various actions, scene, and the like. The visual feature 109 can be determined by using a neural network model, such as a convolutional neural network (CNN) model and/or a long short-term memory (LSTM) model.

As shown in FIG. 1, after determining the contextual feature 105, the audio feature 107, and the visual feature 109 of each video frame, the contextual feature 105, audio feature 107, and visual feature 109 of each video frame can be integrated to generate a plurality of fused features in one-to-one correspondence with the video frames 103, and a video database 111 can be generated by storing the plurality of consecutive fused features.

As can be seen from the above description, this solution comprises determining, for a video frame, a contextual feature indicating contextual information of the video, an audio feature indicating voice text and an ambient sound associated with the video frame, and a visual feature, generating a fused feature by fusing the contextual feature, the audio feature, and the visual feature, and storing a plurality of fused features in a video database. In this way, the generated fused features contain information in various aspects of the video frame. The integration of such multi-modal information makes the understanding of the video content more comprehensive and accurate, and the video database based on the fused features can provide more accurate content retrieval and recommendation. For example, when a user needs to view some clip of a video, he/she only needs to search the video database without browsing the whole video, then the required video frame or video clip can be quickly and accurately displayed.

It should be understood that description of the architecture and function in the example environment 100 is made for illustrative purposes only and does not imply any limitation to the scope of the present disclosure. The embodiments of the present disclosure may also be applied to other environments having different structures and/or functions.

Processes according to embodiments of the present disclosure will be described in detail below with reference to FIGS. 2 to 7. For ease of understanding, the specific data mentioned in the following description are all illustrative and are not used to limit the protection scope of the present disclosure. It can be understood that the embodiments described below may also include additional actions not shown and/or may omit actions shown, and the scope of the present disclosure is not limited in this regard.

Figure 2:
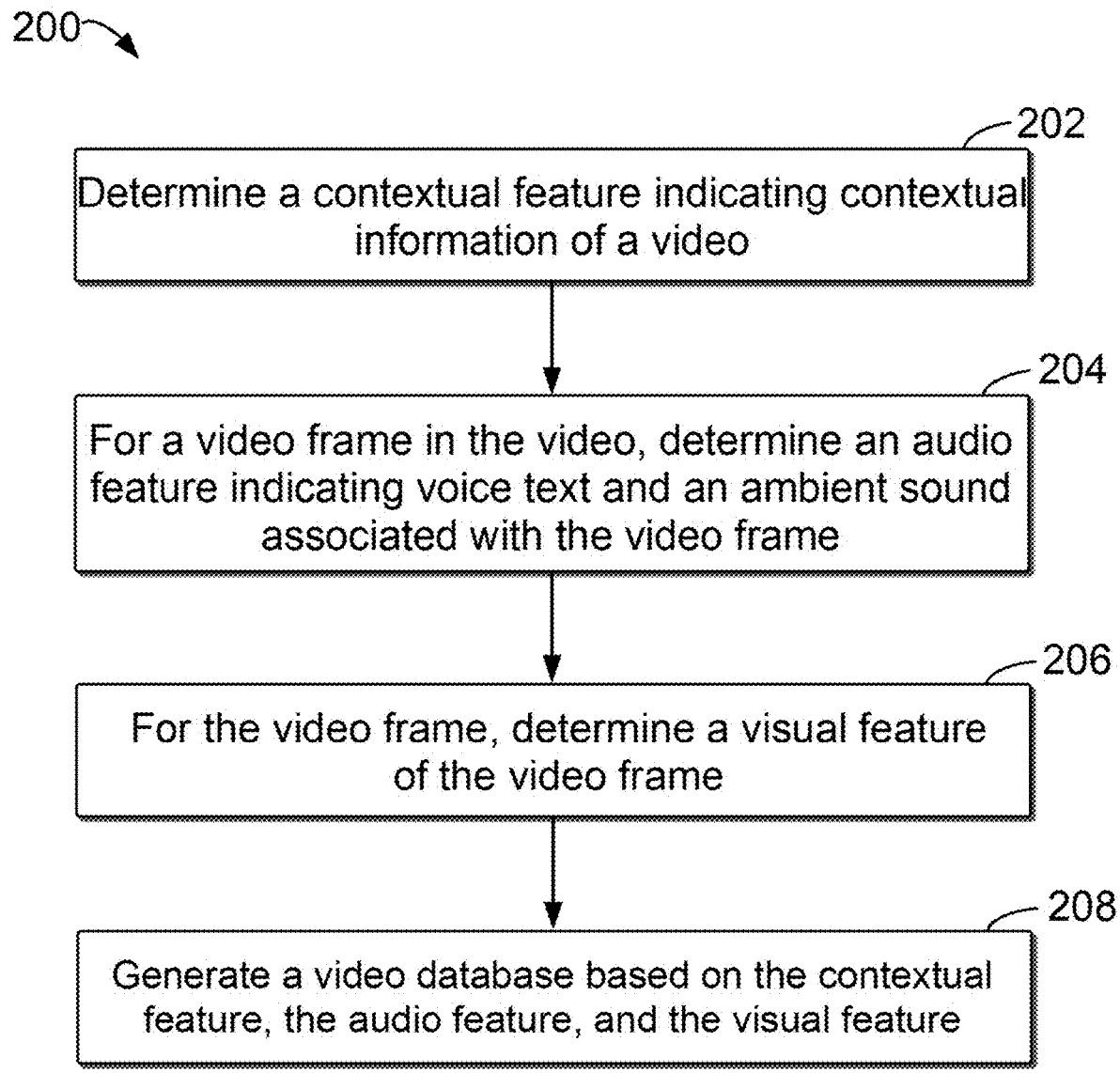
FIG. 2 is a flow chart of a method for generating a video database according to some embodiments of the present disclosure.

FIG. 2 is a flow chart of a method 200 for generating a video database according to some embodiments of the present disclosure. At block 202, a contextual feature indicating contextual information of a video is determined. For example, as shown in FIG. 1, the contextual information may include the information carried by the video 101 itself, such as the author of the video, the given title, the detailed description, the date of creation, the date of last modification, the possible geographical location tag, the knowledge in a specific field, and the like, and may also be widely extended to external data resources related to the video. The contextual information may originate from the internal metadata of the video 101 or may be any data related to the video content acquired from the outside. The contextual information provides rich background information for the video frame 103, which can assist in understanding the overall content and background of the video 101.

At block 204, for a video frame in the video, an audio feature indicating voice text and an ambient sound associated with the video frame is determined. For example, as shown in FIG. 1, the audio feature 107 can be determined based on the audio corresponding to the video frame. The audio may include a voice and an ambient sound. The voice may be a human voice, and the ambient sound may include a non-human voice, such as natural sound, traffic sound, animal sound, or mechanical sound. The audio feature 107 generated from the human voice and the ambient sound can provide auxiliary information for understanding of the video content to assist in understanding the video content.

At block 206, for the video frame, a visual feature of the video frame is determined. For example, as shown in FIG. 1, the visual feature 109 is used to indicate image information included in the video frame 103, such as person, object, title, subtitle, various actions, scene, and the like. The visual feature 109 can be determined by using a neural network model, such as a CNN model and/or an LSTM model.

At block 208, a video database is generated based on the contextual feature, the audio feature, and the visual feature. For example, as shown in FIG. 1, the contextual feature 105, audio feature 107, and visual feature 109 of each video frame can be integrated to generate a plurality of fused features in one-to-one correspondence with the video frames 103. The fused features contain information in various aspects of the video frame, and the integration of such multi-modal information makes the understanding of the video content more comprehensive and accurate. The video database 111 is generated by storing the plurality of consecutive fused features.

In this way, the generated fused features contain information in various aspects of the video frame. The integration of such multi-modal information makes the understanding of the video content more comprehensive and accurate, and the video database based on the fused features can provide more accurate and contextualized retrieval, so that the retrieval results can be closely consistent with the actual intention behind the user query. For example, when a user needs to view some clip of a video, he/she only needs to search the video database without browsing the whole video, then the required video frame or video clip can be quickly and accurately displayed.

The process of generating a video database will be further described in detail with reference to FIGS. 3 to 7. In embodiments of the present disclosure, the explanation is to be made according to the sequence of training a feature fusion model, the global process of generating a video database, determining video associated features, integrating various fused features, and compressing video features. The specific data mentioned in the following description are all illustrative and are not used to limit the protection scope of the present disclosure. It can be understood that the embodiments described below may also include additional actions not shown and/or may omit actions shown, and the scope of the present disclosure is not limited in this regard.

Figure 3:
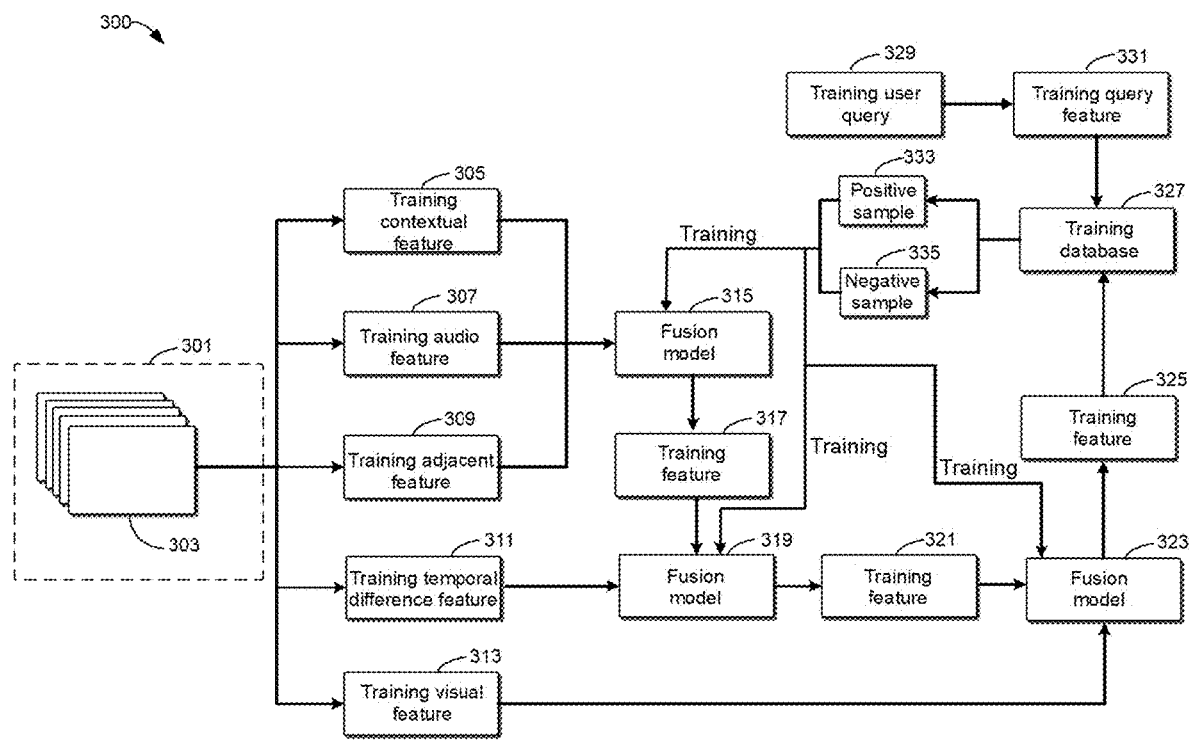
FIG. 3 is a schematic diagram of a process of training a feature fusion model according to some embodiments of the present disclosure.

FIG. 3 is a schematic diagram of a process 300 of training a feature fusion model according to some embodiments of the present disclosure. Before generating a video database by storing a plurality of videos, the feature fusion model can be trained first. As shown in FIG. 3, a video 301 includes a plurality of video frames 303. The video 301 may originate from various sources, such as camera recording, digital media files, or network streaming media, and is used as a training data set to train the feature fusion model. In some embodiments, a training contextual feature 305 can be determined from the video 301, and a training audio feature 307 and a training adjacent feature 309 can be determined for each video frame 303 of the video 301. The details of the training contextual feature 305 and the training audio feature 307 are consistent with the above description, and description thereof will not be made again here. In the process of determining the training adjacent feature 309, a plurality of adjacent frames can be determined for the video frame 303. The number of adjacent frames can be selected according to actual needs, and the training adjacent feature 309 can be determined based on the plurality of adjacent frames.

After the training contextual feature 305, the training audio feature 307, and the training adjacent feature 309 are determined, the training contextual feature 305, the training audio feature 307, and the training adjacent feature 309 can be integrated through a fusion model 315 (also called a first fusion model) among the feature fusion models to generate a training feature 317 (also called a first training feature).

In some embodiments, a training temporal difference feature 311 of the video 301 may also be determined. For the video frame 303, a difference between the video frame 303 and the subsequent frame can be determined, and the training temporal difference feature 311 can be generated based on the difference by using a sequence model. The training temporal difference feature 311 is used to indicate the dynamic information varying over time between the video frames 303, and thus assists in understanding and analyzing the dynamic mode of the video content. After the training temporal difference feature 311 is determined, the training temporal difference feature 311 and the training feature 317 are input into a fusion model 319 (also called a second fusion model) among the feature fusion models, and the training temporal difference feature 311 and the training feature 317 are integrated by using the fusion model 319 to generate a training feature 321 (also called a second training feature).

In some embodiments, a training visual feature 313 of the video frame 303 can also be determined for the video frame 303, and the details of the training visual feature 313 are consistent with the above description, and description thereof will not be made again here. After the training visual feature 313 is determined, the training visual feature 313 and the training feature 321 are input into a fusion model 323 (also called a third fusion model) among the feature fusion models, and the training visual feature 313 and the training feature 321 are integrated by using the fusion model 323 to generate a training feature 325 (also called a third training feature). By integrating the training features 325 in temporal order, a training database 327 can be generated.

As shown in FIG. 3, the training database 327 has a retrieval function, and a user can retrieve a related video frame 303 or video clip from the training database 327 by entering specific query conditions, such as keywords, descriptions, and feature vectors. In order that the feature fusion model can generate a fused feature that can accurately express the video content and provide the user with a more accurate content retrieval service, the feature fusion model can be trained based on the training database 327. The training process may include acquiring a training user query 329, which refers to a simulated user query used in the training process, and the training user query 329 can be extracted from actual user data or can be artificially generated. After the training user query 329 is acquired, a training query feature 331 is generated based on the training user query 329. The training query feature 331 refers to a feature vector extracted from the training user query for expressing the semantics and content of the user query.

After the training query feature 331 is determined, it can be used for retrieval. The training database 327 can generate a positive sample 333 and a negative sample 335 according to a preset strategy. The positive sample 333 refers to the video frame 303 or video clip stored in the training database 327 that is highly correlated or matched with the training user query 329, and the negative sample 335 refers to the video frame 303 or video clip stored in the training database 327 that is not correlated with or is matched to a low degree with the training user query 329. In the process of training the feature fusion model, the role of the positive sample 333 and the negative sample 335 is to assist the fusion model in learning to distinguish between relevant and irrelevant contents. The fusion model 315, the fusion model 319, and the fusion model 323 among the training feature fusion models can all be configured with a contrastive loss function. By minimizing the contrastive loss function, the similarity between the positive sample 333 and the training query feature 331 can be maximized, and the similarity between the negative sample 335 and the training query feature 331 can be minimized, so as to achieve the purpose of training the feature fusion models. The trained feature fusion model can learn how to generate a fused feature that can accurately express the video content, thus providing the user with a more accurate content retrieval service.

Figure 4:
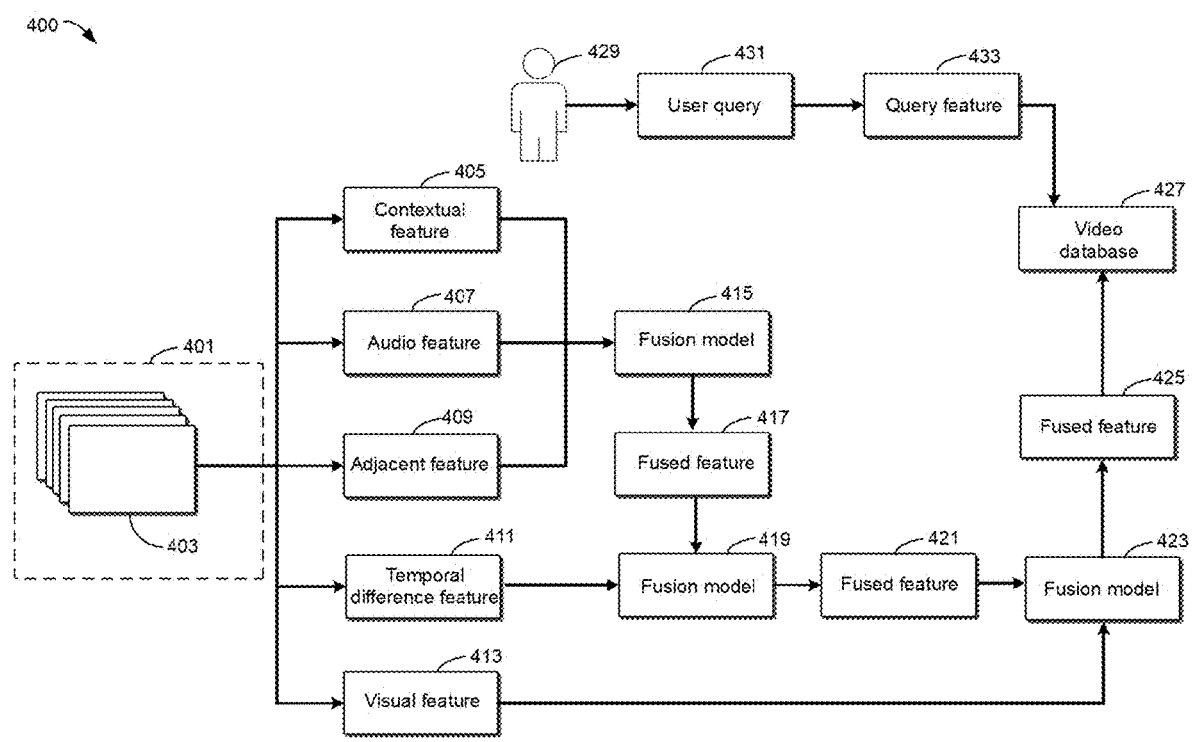
FIG. 4 is a schematic diagram of a global process of generating a video database and retrieving a video clip according to some embodiments of the present disclosure.

FIG. 4 is a schematic diagram of a global process 400 of generating a video database according to some embodiments of the present disclosure. As shown in FIG. 4, a plurality of videos 401 can be stored to generate a video database 427, and each video 401 can include a plurality of video frames 403. The process of generating the video database 427 includes determining a contextual feature 405 based on the video 401, and determining an audio feature 407, an adjacent feature 409, a temporal difference feature 411, and a visual feature 413 for each of the video frames 403.

In some embodiments, the contextual feature 405 can be determined based on the contextual information provided by metadata related to the video 401. The metadata can be defined as $M=\{m_1, m_2, \ldots, m_n\}$, where each $m_i$ represents a metadata element, for example, contextual information such as the time stamp, location, or author, and the contextual information is information associated with the video 401. The details are consistent with the contextual information described in FIG. 1, and description thereof will not be made again here. The metadata element $m_i$ can be encoded into the contextual feature 405 by an embedding function:

$$v_{meta} = f_{meta}(M) \quad (1)$$

where $v_{meta}$ represents the contextual feature, and $f_{meta}$ represents the embedding function.

In some embodiments, an audio feature 407 can be determined for each video frame in the video 401, and the audio feature 407 is used to indicate voice text and an ambient sound associated with the video frame 403. The voice text may be text converted from a human voice, and the ambient sound may include a non-human voice such as natural sound, traffic sound, animal sound, or mechanical sound. In the process of generating the audio feature 407, a plurality of adjacent frames can be determined for the video frame 403 to obtain a video clip, and the audio feature 407 can be generated based on the record of the video clip. In specific implementation, the record of the video clip can be converted into the audio feature 407 through a natural language processing model:

$$v_{audio} = f_{audio}(T) \quad (2)$$

where $v_{audio}$ represents the audio feature, T represents the audio record, and $f_{audio}$ represents the natural language processing model.

In some embodiments, the adjacent feature 409 can be determined for each video frame in the video 401. In order to capture the contextual information provided by the adjacent frames, feature vectors $F=\{f_{i-k}, \ldots, f_i, \ldots, f_{i+k}\}$ of a series of adjacent frames can be extracted, where $f_i$ represents the current frame, and k represents the number of adjacent frames considered for each side. After the feature vectors of a plurality of adjacent frames are extracted, the feature vectors of the plurality of adjacent frames can be integrated by using a combination function to generate the adjacent feature 409:

$$v_{frame} = f_{frame}(F) \quad (3)$$

where $f_{frame}$ represents the combination function, and frame represents the adjacent feature.

In some embodiments, the contextual feature 405 $v_{meta}$, the audio feature 407 $v_{audio}$, and the adjacent feature 409 $v_{frame}$ can be fused by using a trained fusion model 415 (also called the first fusion model). The fusion model 415 may be a neural network model such as a recurrent neural network (RNN) model or an LSTM model, which can be specifically selected according to actual needs. In specific implementation, the fusion model 415 can fuse the contextual feature 405 $v_{meta}$, the audio feature 407 $v_{audio}$, and the adjacent feature 409 $v_{frame}$ through a fusion function to generate a fused feature 417 (also called the first fused feature), which can be generated according to the following formula:

$$v_{context} = f_{fusion}(v_{meta}, v_{frame}, v_{audio}) \quad (4)$$

where $v_{context}$ represents the fused feature, and $f_{fusion}$ represents the fusion function.

In some embodiments, the temporal difference feature 411 can be determined for each video frame 403 in the video 401, and understanding of the temporal evolution of the video content is critical for accurate retrieval. The present disclosure adopts the method of temporal difference encoding (TDE) to capture changes and movements in the video sequence. The TDE process first calculates an inter-frame difference between consecutive frames. For a given frame sequence F={$f_1, f_2, \ldots, f_n$}, the temporal difference $D_{ti}$ between the frame $f_i$ and the frame $f_{i+1}$ is given by the following formula:

$$D_{ti} = f_{diff}(f_i, f_{i+1}) \quad (5)$$

where $f_{diff}$ represents a function for calculating the inter-frame difference. After the temporal difference $D_{ti}$ of the i-th frame is generated, the sequence difference $D_t$={$D_{t1}, D_{t2}, \ldots, D_{m-1}$} can be obtained by using the same TDE method, and the sequence difference Dr is sent into a sequence model to generate the temporal difference feature 411:

$$v_{temp} = f_{seq}(D_t) \quad (6)$$

where $v_{temp}$ represents the temporal difference feature, and $f_{seq}$ represents the sequence model. The sequence model $f_{seq}$ may be an RNN model or an LSTM model, which can be specifically selected according to the actual needs. The sequence model $f_{seq}$ not only encodes the difference, but also encodes the sequence of frames, maintaining the narrative flow of the video content.

In some embodiments, the fused feature 417 $v_{context}$ and the temporal difference feature 411 $v_{temp}$ can be integrated by using a trained fusion model 419 (also called the second fusion model). The fusion model 419 may be a neural network model such as an RNN model or an LSTM model, which can be specifically selected according to actual needs. In specific implementation, the fusion model 419 can integrate the fused feature 417 $v_{context}$ and the temporal difference feature 411 $v_{temp}$ through an integration function to generate a fused feature 421 (also called the second fused feature), and the fused feature 421 can be generated according to the following formula:

$$v_{unified} = f_{integrate}(v_{context}, v_{temp}) \quad (7)$$

where $v_{unified}$ represents the fused feature, and $f_{integrate}$ represents the integration function.

In some embodiments, the visual feature 413 can be determined for each video frame in the video 401. In specific implementation, the visual feature 413 can be extracted by using a pre-trained deep neural network and according to the following formula:

$$v_{visuali} = f_{visual}(f_i) \quad (8)$$

where $v_{visuali}$ represents the visual feature, $f_{visual}$ represents the pre-trained deep neural network, and $f_i$ represents the i-th video frame. After the visual feature 413 $v_{visuali}$ is determined, the fused feature 421 $v_{unified}$ and the visual feature 413 $v_{visuali}$ can be integrated by using a trained fusion model 423 (also called the third fusion model). The fusion model 423 may be a neural network model such as an RNN model or an LSTM model, which can be specifically selected according to actual needs. In a specific implementation, the fusion model 423 can fuse the visual feature 413 $v_{visuali}$ and the fused feature 421 $v_{unified}$ through a combination function to generate a fused feature 425 (also called the third fused feature), which can be generated according to the following formula:

$$v_{combinedi} = f_{combine}(v_{visuali}, v_{unified}) \quad (9)$$

where $v_{combinedi}$ represents the fused feature, and $f_{combine}$ represents the combination function. The combination function $f_{combine}$ is designed to weigh and combine different feature vectors to form a single and dense representation that encapsulates all aspects of the video content.

As shown in FIG. 4, after the fused features 425 $v_{combinedi}$ in one-to-one correspondence with the video frames 403 are generated, the video database 427 can be generated based on the various fused features 425 $v_{combinedi}$. When a user 429 enters a user query 431, the user query 431 can be converted into a query feature 433 by using a method coordinated with the video frame processing mechanism to ensure the consistency of comparison indicators, and then the video database 427 is searched based on the query feature 433. The video database 427 generated according to the solution of the present disclosure can quickly and accurately display the video frame or video clip that meets the user intention.

Figure 5:
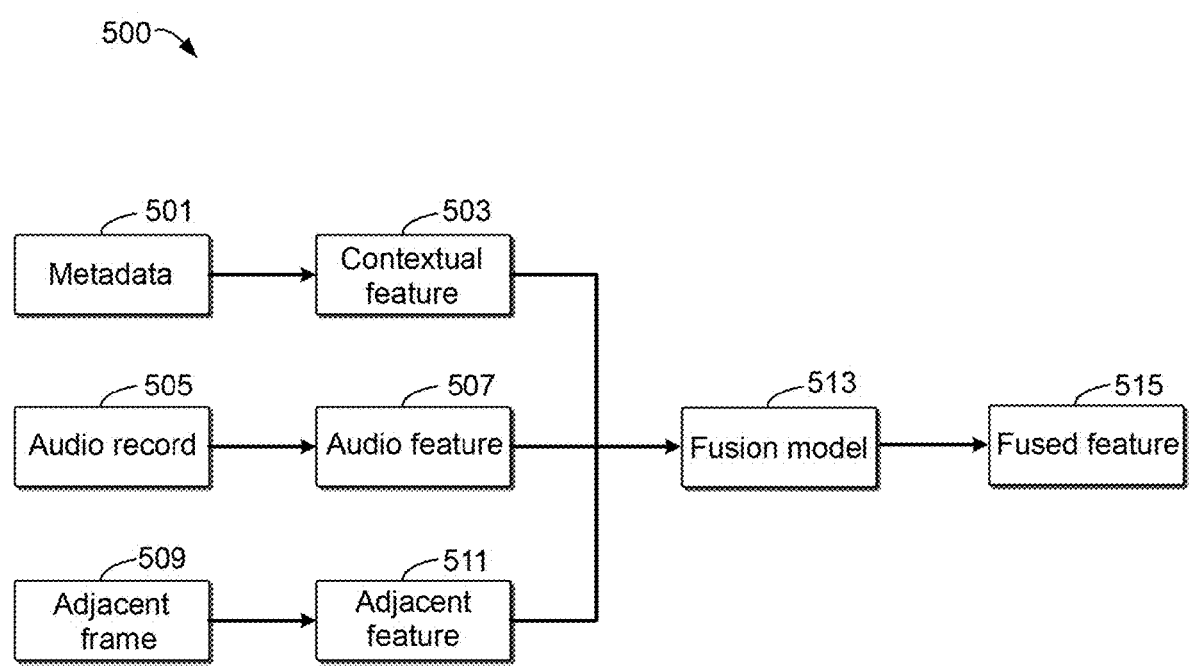
FIG. 5 is a schematic diagram of a process of determining a video associated feature according to some embodiments of the present disclosure.

FIG. 5 is a schematic diagram of a process 500 of determining a video associated feature according to some embodiments of the present disclosure. As shown in FIG. 5, in the process of determining a video associated feature, a contextual feature 503 $v_{meta}$ can be determined based on the contextual information provided by metadata 501 M related to the video. The metadata 501 M may be information carried by the video itself, such as the author, title, description, creation date, modification date, geographical location, knowledge in a specific field, or the like. It may also be external data related to the video, such as the publisher information, release time, number of likes, number of comments, and the like.

In the process of determining a video associated feature, for each video frame in the video, an audio record 505 T can also be determined, and an audio feature 507 $v_{audio}$ can be determined based on the audio record 505 T. The audio record 505 T may include voice text and an ambient sound associated with the video frame. The voice text may be text converted from a human voice, and the ambient sound may include a non-human voice such as natural sound, traffic sound, animal sound, or mechanical sound. In the process of generating the audio feature 507 $v_{audio}$, a plurality of adjacent frames can be determined for the video frame to obtain a video clip, and the audio feature 507 $v_{audio}$ is generated based on the audio record 505 T of the video clip.

In the process of determining a video associated feature, an adjacent feature 511 can also be determined for each video frame in the video. In order to capture the contextual information provided by the adjacent frame 509, feature vectors of a series of adjacent frames 509 can be extracted. After the feature vectors of a plurality of adjacent frames 509 are extracted, the feature vectors of the plurality of adjacent frames 509 can be integrated to generate the adjacent feature 511 $v_{frame}$.

In some embodiments, the contextual feature 503 $v_{meta}$, the audio feature 507 $v_{audio}$, and the adjacent feature 511 $v_{frame}$ can be fused by using a trained fusion model 513 (also called the first fusion model) to generate a fused feature 515 $v_{context}$ (also called the first fused feature). The fusion model 513 may be a neural network model such as an RNN model or an LSTM model, which can be specifically selected according to actual needs.

Figure 6:
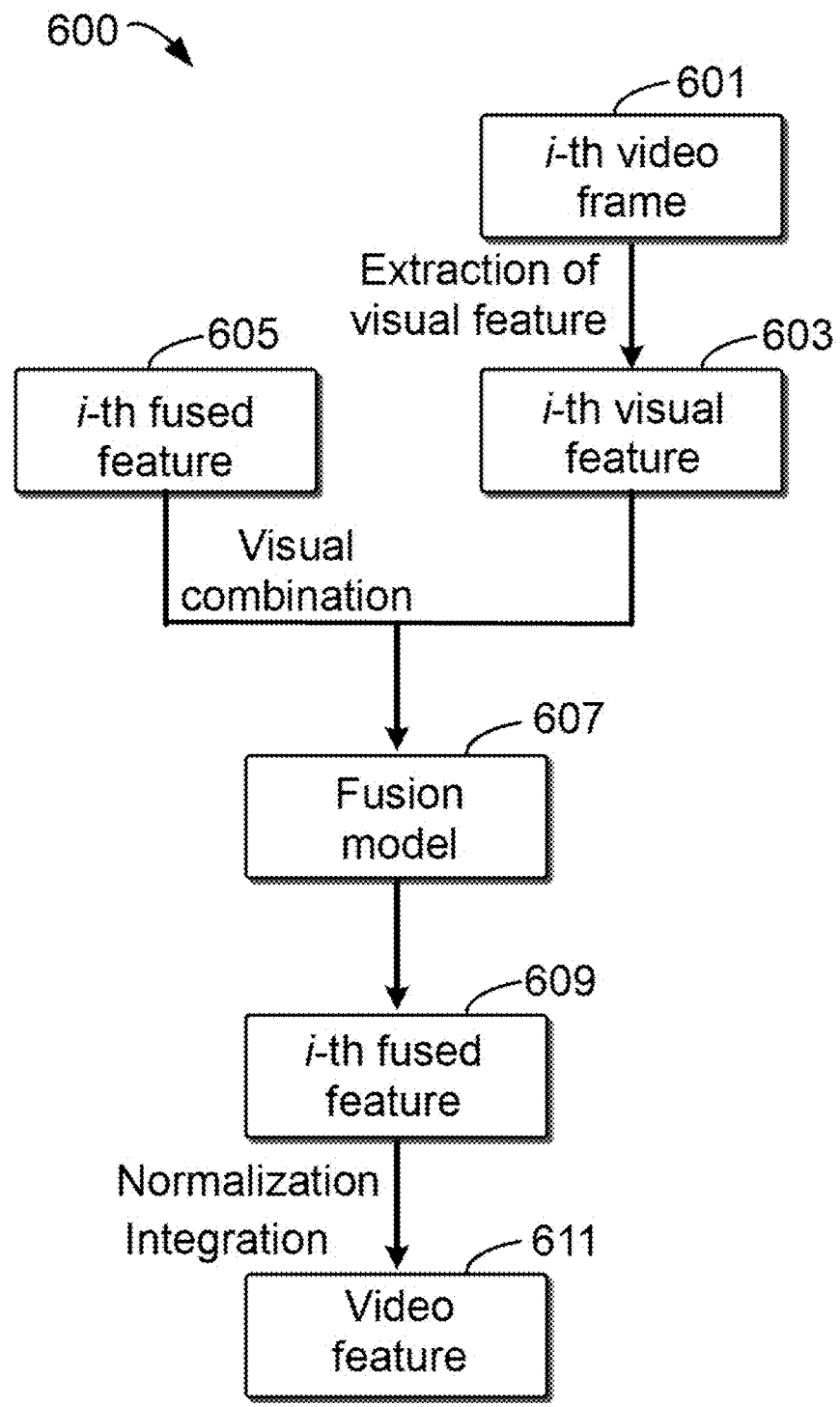
FIG. 6 is a schematic diagram of a process of integrating various fused features according to some embodiments of the present disclosure.

FIG. 6 shows a schematic diagram of a process 600 of integrating various fused features according to some embodiments of the present disclosure. As shown in FIG. 6, the i-th visual feature 603 $v_{visuali}$ can be determined for the i-th video frame 601 $f_i$ by using a pre-trained deep neural network. After the i-th visual feature 603 $v_{visuali}$ is determined, the i-th fused feature 605 $v_{unified}$ (also called the second fused feature) and the i-th visual feature 603 $v_{visuali}$ can be integrated by using a trained fusion model 607 (also called the third fusion model) to generate the i-th fused feature 609 $v_{combinedi}$ (also called the third fused feature), which corresponds to the i-th video frame 601 $f_i$. Finally, according to the temporal play order of the video frames, each fused feature is normalized and integrated, and the combination of the fused features of the plurality of video frames is expressed as $v_{combined} = \{v_{combined1}, \ldots, v_{combinedn}\}$. The combination is standardized and aggregated over the whole video sequence to form a video feature 611 $v_{video}$ at the video level:

$$v_{video} = f_{aggregate}(\{f_{normalize}(v_{combinedi})\}_{i=1}^n) \quad (10)$$

where $f_{aggregate}$ represents the aggregation function, and $f_{normalize}$ represents the normalization function.

Figure 7:
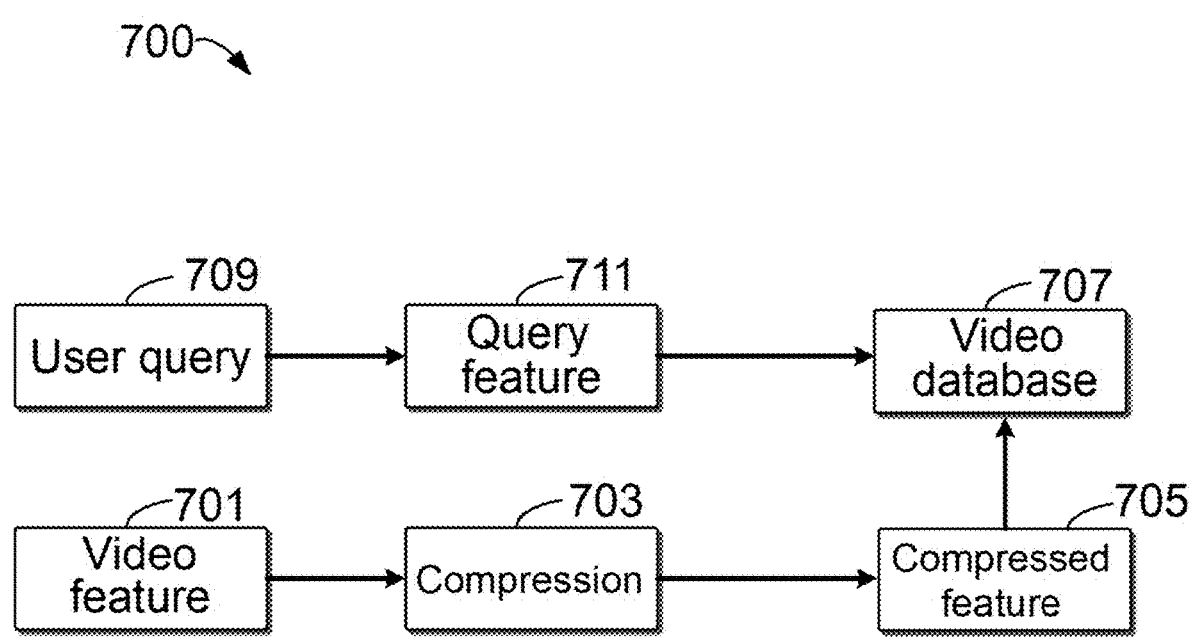
FIG. 7 is a schematic diagram of a process of compressing a video feature according to some embodiments of the present disclosure.

FIG. 7 is a schematic diagram of a process 700 of compressing a video feature according to some embodiments of the present disclosure. As shown in FIG. 7, a video database 707 is constructed by indexing a video feature 701 $v_{video}$. Each entry in the video database 707 corresponds to a video or a clip in a video:

$$DB = \{(v_{video1}, i_{d1}), \ldots, (v_{videom}, i_{dm})\} \quad (11)$$

where $i_{di}$ represents the identifier of the video or video clip, and DB represents the video database. After the video feature 701 $v_{video}$ at the video level is generated, during retrieval, the user not only can retrieve a video frame or a video clip, but also can find a whole video corresponding to the query through the video feature 701 $v_{video}$.

At block 703, the video feature is compressed into compressed feature 705. After the video feature 701 $v_{video}$ is generated, in order to optimize the storage and retrieval efficiency, the video feature 701 $v_{video}$ can be compressed by using a vector quantization method and according to the following formula:

$$v_{compressedi} = f_{compress}(v_{videoi}) \quad (12)$$

where $f_{compress}$ represents the vector quantization function, and $v_{compressedi}$ represents the compressed feature.

When the user enters a user query 709, the user query 709 can be converted into a query feature 711 by using a method coordinated with the video frame processing mechanism to ensure the consistency of comparison indicators, and then the video database 707 can be searched according to the query feature 711. In an embodiment of the present disclosure, the query feature 711 can be matched with the video feature 701 $v_{video}$ in the video database by using an approximate nearest neighbor (ANN) search algorithm:

$$matches = ANN(f_{sim}(v_{query}, DB)) \quad (13)$$

where $f_{sim}$ represents the ANN search algorithm, and $v_{query}$ represents the query feature. Through the ANN search algorithm, the video clip that best matches the query can be quickly found based on the similarity score. The present disclosure combines efficient vector compression and indexing technology, so that the video retrieval system can realize quick and accurate retrieval in a large-scale database, and the retrieval efficiency and quality are improved.

Figure 8:
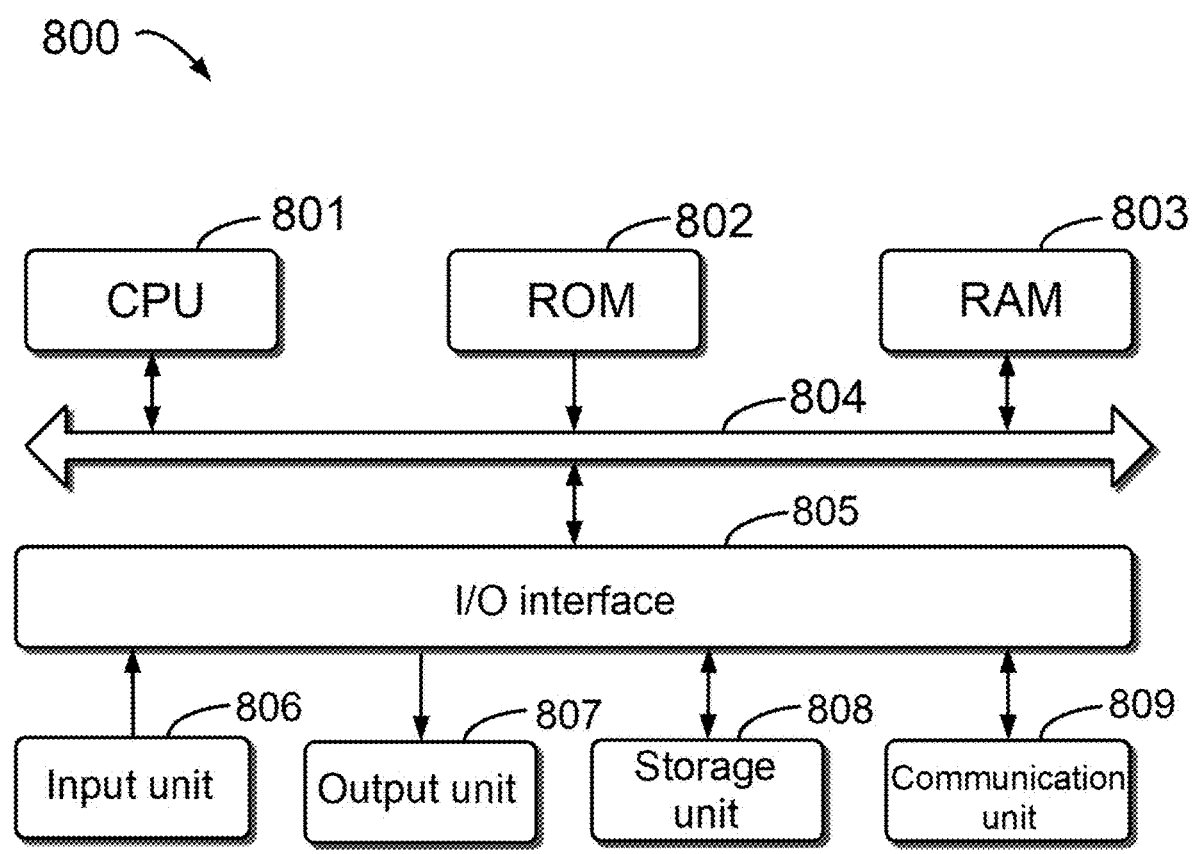
FIG. 8 is a block diagram of a device that can implement embodiments of the present disclosure.

FIG. 8 is a block diagram of an example device 800 that can be used to implement embodiments of the present disclosure. As shown in the figure, the device 800 includes a computing unit 801, illustratively implemented as at least one central processing unit (CPU), which may execute various appropriate actions and processing according to computer program instructions stored in a read-only memory (ROM) 802 or computer program instructions loaded from a storage unit 808 onto a random access memory (RAM) 803. Various programs and data required for the operation of the device 800 may also be stored in the RAM 803. The computing unit 801, the ROM 802, and the RAM 803 are connected to each other through a bus 804. An input/output (I/O) interface 805 is also connected to the bus 804.

Components in the device 800 are connected to the I/O interface 805, including: an input unit 806, such as a keyboard and a mouse; an output unit 807, such as various types of displays and speakers; the storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The computing unit 801 may be various general-purpose and/or special-purpose processing components with processing and computing capabilities. Some examples of the computing unit 801 include, but are not limited to, the above-noted one or more CPUs, graphics processing units (GPUs), various special-purpose artificial intelligence (AI) computing chips, various computing units for running machine learning model algorithms, digital signal processors (DSPs), and any appropriate processors, controllers, microcontrollers, and the like. The computing unit 801 performs various methods and processes described above, such as the method 200. For example, in some embodiments, the method 200 may be implemented as a computer software program that is tangibly included in a machine-readable medium, such as the storage unit 808. In some embodiments, some or all of the computer program may be loaded and/or installed onto the device 800 via the ROM 802 and/or the communication unit 809. When the computer program is loaded to the RAM 803 and executed by the computing unit 801, one or step of the method 200 described above can be performed. Alternatively, in other embodiments, the computing unit 801 may be configured to implement the method 200 in any other suitable manner (e.g., by means of firmware).

The functions described herein may be executed at least in part by one or hardware logic components. For example, without limitation, example types of the hardware logic components that can be used include: a field programmable gate array (FPGA), an application specific integrated circuit (ASIC), an application specific standard product (ASSP), a system on chip (SOC), a complex programmable logic device (CPLD), and the like.

Program codes for implementing the method of the present disclosure may be written by using one programming language or any combination of programming languages. The program codes may be provided to a processor or controller of a general purpose computer, a special purpose computer, or another programmable data processing apparatus, such that the program codes, when executed by the processor or controller, implement the functions/operations specified in the flow charts and/or block diagrams. The program codes may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or wire, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination thereof. Additionally, although operations are depicted in a particular order, this should not be construed as an indication that such operations are required to be performed in the particular order shown or in a sequential order, or that all illustrated operations should be performed to achieve desirable results. In a certain environment, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. In contrast, various features that are described in the context of a single implementation may also be implemented in implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the particular features and actions described above are merely example forms in which the claims are implemented.

What is claimed is:

1. A method, comprising:
    determining, in a processor-based machine learning system, a contextual feature indicating contextual information of a video, the processor-based machine learning system implementing a plurality of feature fusion models, including at least a first fusion model, a second fusion model and a third fusion model, each such fusion model comprising at least one neural network;
    for a video frame in the video, determining, in the processor-based machine learning system, an audio feature indicating voice text and an ambient sound associated with the video frame;
    for the video frame, determining, in the processor-based machine learning system, a visual feature of the video frame; and
    generating, in the processor-based machine learning system, a video database based on the contextual feature, the audio feature, and the visual feature;
    wherein generating the video database comprises:
    applying the contextual feature and the audio feature to respective inputs of the first fusion model;
    applying an output of the first fusion model to an input of the second fusion model, the second fusion model also receiving as an additional input an additional feature different than the contextual feature, the audio feature and the visual feature, the additional feature comprising a temporal-related feature;
    applying an output of the second fusion model to an input of the third fusion model, the third fusion model also receiving as an additional input the visual feature; and
    generating the video database based on an output of the third fusion model.

2. The method according to claim 1, wherein generating the video database comprises:
    for the video frame in the video, determining an adjacent frame to the video frame;
    determining an adjacent feature corresponding to the video frame based on the adjacent frame; and generating the video database based on the contextual feature, the audio feature, the visual feature, and the adjacent feature.

3. The method according to claim 2, wherein generating the video database further comprises:
for the video frame in the video, determining a difference between the video frame and a subsequent frame;
generating, by a sequence model, a temporal difference feature based on the difference; and
generating the video database based on the contextual feature, the audio feature, the visual feature, the adjacent feature, and the temporal difference feature.

4. The method according to claim 3, wherein generating the video database further comprises:
generating, by the first fusion model, a first fused feature based on the contextual feature, the audio feature, and the adjacent feature;
generating, by the second fusion model, a second fused feature based on the first fused feature and the temporal difference feature;
generating, by the third fusion model, a third fused feature based on the second fused feature and the visual feature; and
integrating the third fused feature and one or more additional fused features in temporal order to obtain a video feature corresponding to the video so as to generate the video database.

5. The method according to claim 4, wherein training of the feature fusion models comprises:
generating, by the first fusion model, a first training feature based on a training contextual feature, a training audio feature, and a training adjacent feature;
generating, by the second fusion model, a second training feature based on the first training feature and a training temporal difference feature;
generating, by the third fusion model, a third training feature based on the second training feature and a training visual feature; and
integrating the third training feature and one or more additional training features in temporal order to generate a training video feature corresponding to the video so as to generate a training database.

6. The method according to claim 5, further comprising:
in response to receiving a training user query, converting the training user query into a training query feature; and
training the first fusion model, the second fusion model, and the third fusion model based on the training query feature and the training database.

7. The method according to claim 6, wherein training the first fusion model, the second fusion model, and the third fusion model comprises:
determining a positive sample and a negative sample in the training database based on the training query feature and a preset strategy;
calculating a similarity between the training query feature and the positive sample as well as the negative sample; and
training the first fusion model, the second fusion model, and the third fusion model based on a contrastive loss function and the similarity.

8. The method according to claim 1, further comprising:
in response to receiving a user query, converting the user query into a query feature;
determining one or more video frames associated with the user query in the video database based on the query feature; and
displaying a video clip based on the one or more video frames associated with the user query.

9. The method according to claim 8, wherein determining one or more video frames associated with the user query in the video database comprises:
determining a similarity between the query feature and a video feature stored in the video database; and
determining one or more video frames associated with the user query in the video database based on the similarity.

10. An electronic device, comprising:
at least one processor; and
memory coupled to the at least one processor and having instructions stored therein, wherein the instructions, when executed by the at least one processor, cause the electronic device to perform actions comprising:
determining, in a processor-based machine learning system, a contextual feature indicating contextual information of a video, the processor-based machine learning system implementing a plurality of feature fusion models, including at least a first fusion model, a second fusion model and a third fusion model, each such fusion model comprising at least one neural network;
for a video frame in the video, determining, in the processor-based machine learning system, an audio feature indicating voice text and an ambient sound associated with the video frame;
for the video frame, determining, in the processor-based machine learning system, a visual feature of the video frame; and
generating, in the processor-based machine learning system, a video database based on the contextual feature, the audio feature, and the visual feature;
wherein generating the video database comprises:
applying the contextual feature and the audio feature to respective inputs of the first fusion model;
applying an output of the first fusion model to an input of the second fusion model, the second fusion model also receiving as an additional input an additional feature different than the contextual feature, the audio feature and the visual feature, the additional feature comprising a temporal-related feature;
applying an output of the second fusion model to an input of the third fusion model, the third fusion model also receiving as an additional input the visual feature; and
generating the video database based on an output of the third fusion model.

11. The electronic device according to claim 10, wherein generating the video database comprises:
for the video frame in the video, determining an adjacent frame to the video frame;
determining an adjacent feature corresponding to the video frame based on the adjacent frame; and
generating the video database based on the contextual feature, the audio feature, the visual feature, and the adjacent feature.

12. The electronic device according to claim 11, wherein generating the video database further comprises:
for the video frame in the video, determining a difference between the video frame and a subsequent frame;
generating, by a sequence model, a temporal difference feature based on the difference; and
generating the video database based on the contextual feature, the audio feature, the visual feature, the adjacent feature, and the temporal difference feature.

13. The electronic device according to claim 12, wherein generating the video database further comprises:

generating, by the first fusion model, a first fused feature based on the contextual feature, the audio feature, and the adjacent feature;

generating, by the second fusion model, a second fused feature based on the first fused feature and the temporal difference feature;

generating, by the third fusion model, a third fused feature based on the second fused feature and the visual feature; and integrating the third fused feature and one or more additional fused features in temporal order to obtain a video feature corresponding to the video so as to generate the video database.

14. The electronic device according to claim 13, wherein training of the feature fusion models comprises:

generating, by the first fusion model, a first training feature based on a training contextual feature, a training audio feature, and a training adjacent feature;

generating, by the second fusion model, a second training feature based on the first training feature and a training temporal difference feature;

generating, by the third fusion model, a third training feature based on the second training feature and a training visual feature; and integrating the third training feature and one or more additional training features in temporal order to generate a training video feature corresponding to the video so as to generate a training database.

15. The electronic device according to claim 14, wherein the actions further comprise:

in response to receiving a training user query, converting the training user query into a training query feature; and training the first fusion model, the second fusion model, and the third fusion model based on the training query feature and the training database.

16. The electronic device according to claim 15, wherein training the first fusion model, the second fusion model, and the third fusion model comprises:

determining a positive sample and a negative sample in the training database based on the training query feature and a preset strategy;

calculating a similarity between the training query feature and the positive sample as well as the negative sample; and training the first fusion model, the second fusion model, and the third fusion model based on a contrastive loss function and the similarity.

17. The electronic device according to claim 10, wherein the actions further comprise:

in response to receiving a user query, converting the user query into a query feature;

determining one or more video frames associated with the user query in the video database based on the query feature; and displaying a video clip based on the one or more video frames associated with the user query.

18. The electronic device according to claim 17, wherein determining one or more video frames associated with the user query in the video database comprises:

determining a similarity between the query feature and a video feature stored in the video database; and determining one or more video frames associated with the user query in the video database based on the similarity.

19. A computer program product tangibly stored on a non-transitory computer-readable medium and comprising machine-executable instructions, wherein the machine-executable instructions, when executed by a machine, cause the machine to perform actions comprising:

determining, in a processor-based machine learning system, a contextual feature indicating contextual information of a video, the processor-based machine learning system implementing a plurality of feature fusion models, including at least a first fusion model, a second fusion model and a third fusion model, each such fusion model comprising at least one neural network;

for a video frame in the video, determining, in the processor-based machine learning system, an audio feature indicating voice text and an ambient sound associated with the video frame;

for the video frame, determining, in the processor-based machine learning system, a visual feature of the video frame; and generating, in the processor-based machine learning system, a video database based on the contextual feature, the audio feature, and the visual feature;

wherein generating the video database comprises:

applying the contextual feature and the audio feature to respective inputs of the first fusion model;

applying an output of the first fusion model to an input of the second fusion model, the second fusion model also receiving as an additional input an additional feature different than the contextual feature, the audio feature and the visual feature, the additional feature comprising a temporal-related feature;

applying an output of the second fusion model to an input of the third fusion model, the third fusion model also receiving as an additional input the visual feature; and generating the video database based on an output of the third fusion model.

20. The computer program product according to claim 19, wherein generating the video database further comprises:

for the video frame in the video, determining an adjacent frame to the video frame;

determining an adjacent feature corresponding to the video frame based on the adjacent frame; and generating the video database based on the contextual feature, the audio feature, the visual feature, and the adjacent feature.

* * * * *